(12) United States Patent
Dowlatabadi

(10) Patent No.: US 8,797,010 B2
(45) Date of Patent: Aug. 5, 2014

(54) STARTUP FOR DC/DC CONVERTERS

(75) Inventor: Ahmad B. Dowlatabadi, San Jose, CA (US)

(73) Assignee: Aivaka, Inc., San Jose, CA (US)

( * ) Notice: Subject to any disclaimer, the term of this patent is extended or adjusted under 35 U.S.C. 154(b) by 0 days.

(21) Appl. No.: 11/796,224

(22) Filed: Apr. 27, 2007

(65) Prior Publication Data

US 2007/0253229 A1 Nov. 1, 2007

Related U.S. Application Data

(60) Provisional application No. 60/795,990, filed on Apr. 27, 2006.

(51) Int. Cl.
*H02M 1/36* (2007.01)
*H02M 3/156* (2006.01)

(52) U.S. Cl.
USPC ............................. 323/284; 363/49; 323/901

(58) Field of Classification Search
USPC ......... 323/222, 223, 224, 282, 284, 285, 351, 323/901; 363/49
See application file for complete search history.

(56) References Cited

U.S. PATENT DOCUMENTS

| | | | |
|---|---|---|---|
| 3,594,649 A | 7/1971 | Rauch | |
| 5,485,077 A | 1/1996 | Werrbach | |
| 5,912,575 A | 6/1999 | Takikawa | |
| 6,069,807 A | 5/2000 | Boylan et al. | |
| 6,184,663 B1 | 2/2001 | Imai et al. | |
| 6,396,716 B1 | 5/2002 | Liu et al. | |
| 6,404,290 B1 | 6/2002 | Voo | |
| 6,473,457 B1 | 10/2002 | Pascual et al. | |
| 6,624,619 B2 * | 9/2003 | Fujita et al. | 323/288 |
| 6,670,796 B2 | 12/2003 | Mori | |
| 6,674,272 B2 * | 1/2004 | Hwang | 323/284 |
| 6,815,938 B2 * | 11/2004 | Horimoto | 323/282 |
| 6,847,231 B2 | 1/2005 | Kinugawa et al. | |
| 6,906,499 B2 * | 6/2005 | Hussein et al. | 323/222 |
| 7,091,770 B2 | 8/2006 | Schlaffer | |
| 7,102,338 B2 | 9/2006 | Osburn et al. | |
| 7,208,919 B2 | 4/2007 | May | |
| 7,265,523 B2 | 9/2007 | Dowlatabadi | |
| 7,336,060 B2 * | 2/2008 | Ito | 323/299 |
| 7,420,357 B2 | 9/2008 | Bayer | |
| 7,652,603 B2 | 1/2010 | Morishima | |

(Continued)

FOREIGN PATENT DOCUMENTS

EP 1367703 12/2003
JP 03128668 5/1991

(Continued)

*Primary Examiner* — Gary L Laxton
(74) *Attorney, Agent, or Firm* — James E. Eakin

(57) ABSTRACT

A design and method for controlling the initial inductor current in a DC/DC switching regulator. The $T_{on}$ or $T_{off}$ time, depending upon implementation, is gradually increased such that power applied to a load is initially constrained until the system reaches a stable state, at which time normal power is connected to the load. In an embodiment, the on or off time is limited by a circuit which controls a pair of complementary transistors. The states of the transistors are controlled by the use of a startup-phase voltage and a reference voltage, which are then compared in an error amplifier. The result of the comparison is compared to a sawtooth signal in a comparator, the output of which controls the state of complementary transistors.

13 Claims, 4 Drawing Sheets

(56) References Cited

U.S. PATENT DOCUMENTS

| | | | |
|---|---|---|---|
| 7,940,033 | B2 | 5/2011 | Dowlatabadi |
| 2006/0082394 | A1 | 4/2006 | Briskin et al. |
| 2006/0119400 | A1 | 6/2006 | Ohnhauser et al. |
| 2008/0265880 | A1 | 10/2008 | Nishikawa |

FOREIGN PATENT DOCUMENTS

| | | |
|---|---|---|
| JP | 05304771 | 11/1993 |
| JP | 10098380 | 4/1998 |
| WO | 9931790 | 6/1999 |
| WO | WO03030352 | 4/2003 |

* cited by examiner

STARTUP FOR DC/DC CONVERTERS

RELATED APPLICATION

This application claims the benefit of U.S. Provisional Patent Application Ser. No. 60/795,990 filed Apr. 27, 2006, which is incorporated herein by reference in its entirety.

FIELD OF INVENTION

This invention relates generally to switching regulators, and more particularly relates to 'soft' startup of switching regulators.

BACKGROUND OF INVENTION

Switching power regulators or converters (SPC) are often used in electronic systems to convert a direct current (DC) voltage into a different DC voltage. Or, they may be used to convert an alternative current (AC) voltage into a DC voltage, or even converting a DC voltage into an AC voltage. They are widely used in both portable and non-portable applications for a large variety of applications and of power and voltage ranges. There are numerous architectures for each application such as Buck (Step Down), Boost (Step Up), H-Bridge, and Fly Back. Many common products use SPC's, including digital cameras, cell phones, MP3 players, and so on, and in many instances there are several different SPC's in one such product, each with their own particular load and controllers and their particular sets of specifications.

One approach to implementing a step-down (or 'Buck') DC-DC converter is called the Pulse Width Modulation (PWM) regulation method. In a PWM regulator, the oscillation frequency is kept constant, while the duty cycle is varied to control output voltage. Another approach is Pulse Frequency Modulation (PFM), where, for example, the value of the on-time can be kept constant and regulation can be achieved by varying the value of the off-time (defined as $T_{off}=T-T_{on}$). Or, alternatively, off time ($T_{off}$) can be kept constant and $T_{on}$ can be varied to control the output voltage. In both cases for a PFM regulator the period of clock (T) is changed while either $T_{off}$ or $T_{on}$ is kept constant.

One of the problems with either approach occurs when the system is initially powered on. Many designs include an inductor which can create issues due to the 'short circuit' behavior of an inductor at power on, Absent current limiting at power on, many designs of SPC's can supply a sufficiently high current to damage the inductor and potentially other components. Thus, it is important to control the value of $I_{on}$ during the initial turn on.

One of the common schemes to control the initial value of $T_{on}$ and to limit the initial current is to add various components to the design. In one approach, a capacitor is added, and by slowly charging the capacitor and by using the voltage on the capacitor to slowly increase the value of $T_{on}$, a safe power on is achieved.

SUMMARY OF INVENTION

The present invention provides a design and method for controlling the initial inductor current in a DC/DC switching regulator without the need for additional components. A power source is connected to a load through a pair of complementary transistors and an inductor. A resistor divider is connected between the load and ground, and a comparator is connected to the midpoint of the divider through a pair of switches. When power is first applied, the switches are actuated to prevent direct connection of power from the power source to the load, and instead power is applied slowly. When the voltage reaches a predetermined threshold, the positions of the switches are changed, and power to the load is applied in the normal manner. Various alternative embodiments are disclosed.

THE FIGURES

DETAILED DESCRIPTION OF THE INVENTION

Figure 1:
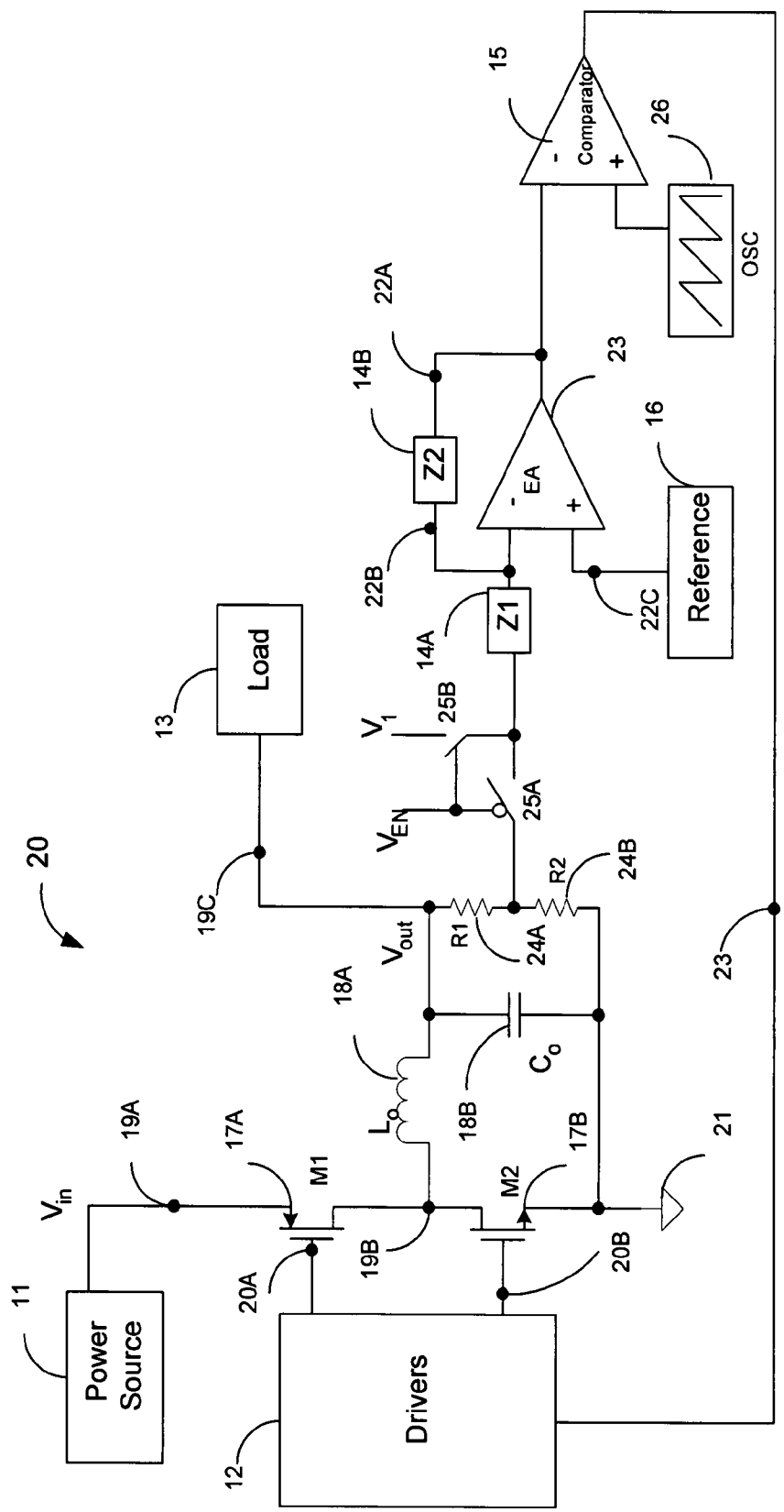
FIG. 1 illustrates a first embodiment of a startup circuit for a DC/DC converter in accordance with the invention.
Figure 2:
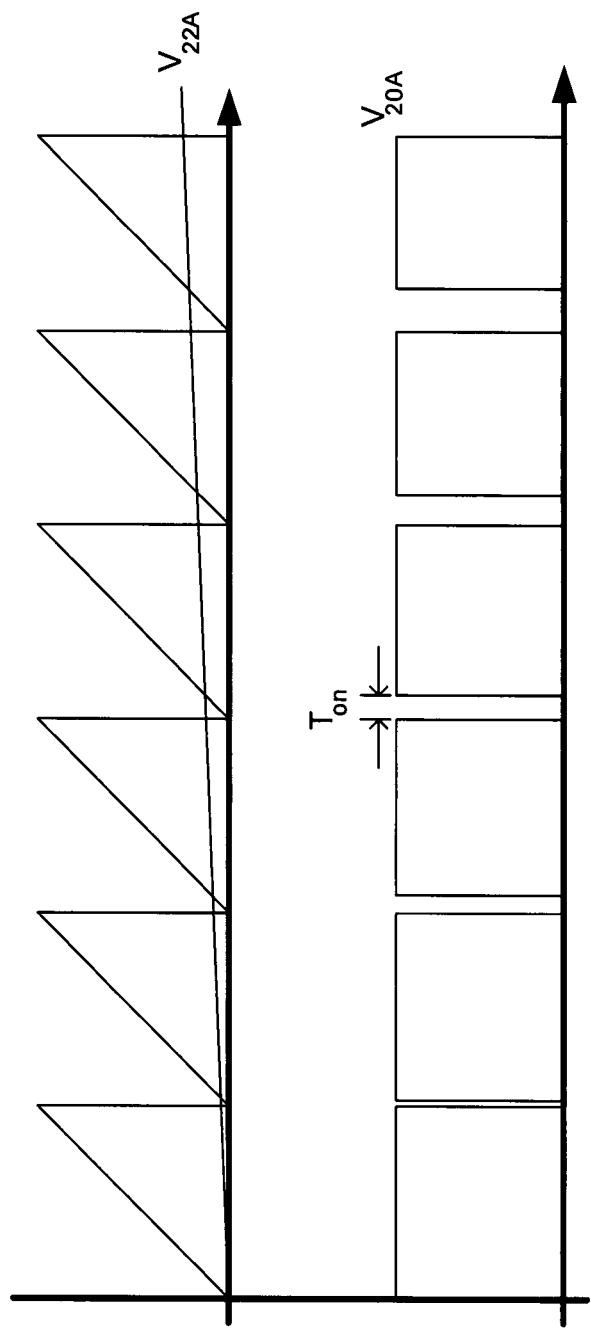
FIG. 2 illustrates the increase in $T_{on}$ over time, thereby providing a slowly increasing voltage to a load.

The present invention provides a design and method for controlling the initial inductor current in a DC/DC switching regulator without the need for additional components, as can be appreciated from FIGS. 1 and 2. FIG. 1 shows a simplified circuit diagram of an embodiment of a regulator that implements the current invention, while FIG. 2 shows the increase in $T_{on}$ over time, which provides a slowly increasing voltage to a load. Essentially, a power source 11 provides power through drivers block 12 to a load 13, through a pair of complementary transistors M1 and M2, indicated at 20A and 20B, connected together at node 19B. An inductor L, indicated at 18A, is connected between the node 19B and a node Vout, indicated at 19C, to which the load 13 is connected. The gates of the transistors M1 and M2 are controlled by the drivers block 12, and the remaining side of transistor M2 is connected to ground. A capacitor Co, indicated at 18B, connects between ground and the node $V_{out}$. A resistor divider comprising resistors R1 and R2, indicated at 24A and 24B respectively, is connected in parallel with the capacitor Co, or between the node $V_{out}$ and ground. At the node between the resistors R1 and R2 is connected a first switch, indicated at 25A and a second switch 25B. When an enable voltage, indicated as $V_{EN}$, is applied such that $V_{EN}=1$ as shown in FIG. 1, switch 25A opens and switch 25B connects the voltage $V_1$ to the impedance Z1, indicated at 14A. When $V_{EN}$ is removed, or goes low, switch 25A closes and switch 25B closes, such that the circuit operates normally from the power source 11; but when $V_{EN}$ is high, the voltage $V_1$ is applied which causes the soft start of the present invention to occur.

A first impedance Z1, indicated at 14A, connects between the switches 25A-B and the negative input of an error amplifier 23. A reference voltage, indicated at 16, provides the positive input to the error amplifier. A second impedance Z2, indicated at 14B, provides a feedback loop around the error amplifier. The output of the error amplifier 23 is fed to the negative input of a comparator 15, the positive input of which is fed by a sawtooth source, indicated at 26. The output of the comparator 15 provides the input to the drivers block 12.

The start-up condition can now be appreciated. The voltage $V_1$ is set to be larger than the reference voltage created by the reference block 16. So, when $V_{EN}=1$, voltage $V_1$ is applied to Z1 by closing the switch between Z1 and voltage $V_1$ and the loop is broken by turning off the switch. $V_{EN}$ can be controlled by an external signal.

The output of the error amplifier 23, indicated at node 22A, is at the lowest possible voltage in the system and is set to zero here ($V_{22A}=0$). Once the regulator is activated to operate and $V_{EN}$ is set to zero ($V_{EN}=0$), the output of error amplifier 23 slowly rises which in turn slowly increases the value of $T_{on}$ for this particular example, as shown by in FIG. 2. It must be noted that if $V_1$ were set to a value lower than the reference voltage 16 on node 22c, then $V_{22A}$ would be at the maximum possible voltage. The two switches 25A-B can be implemented before or after Z1.

Figure 3:
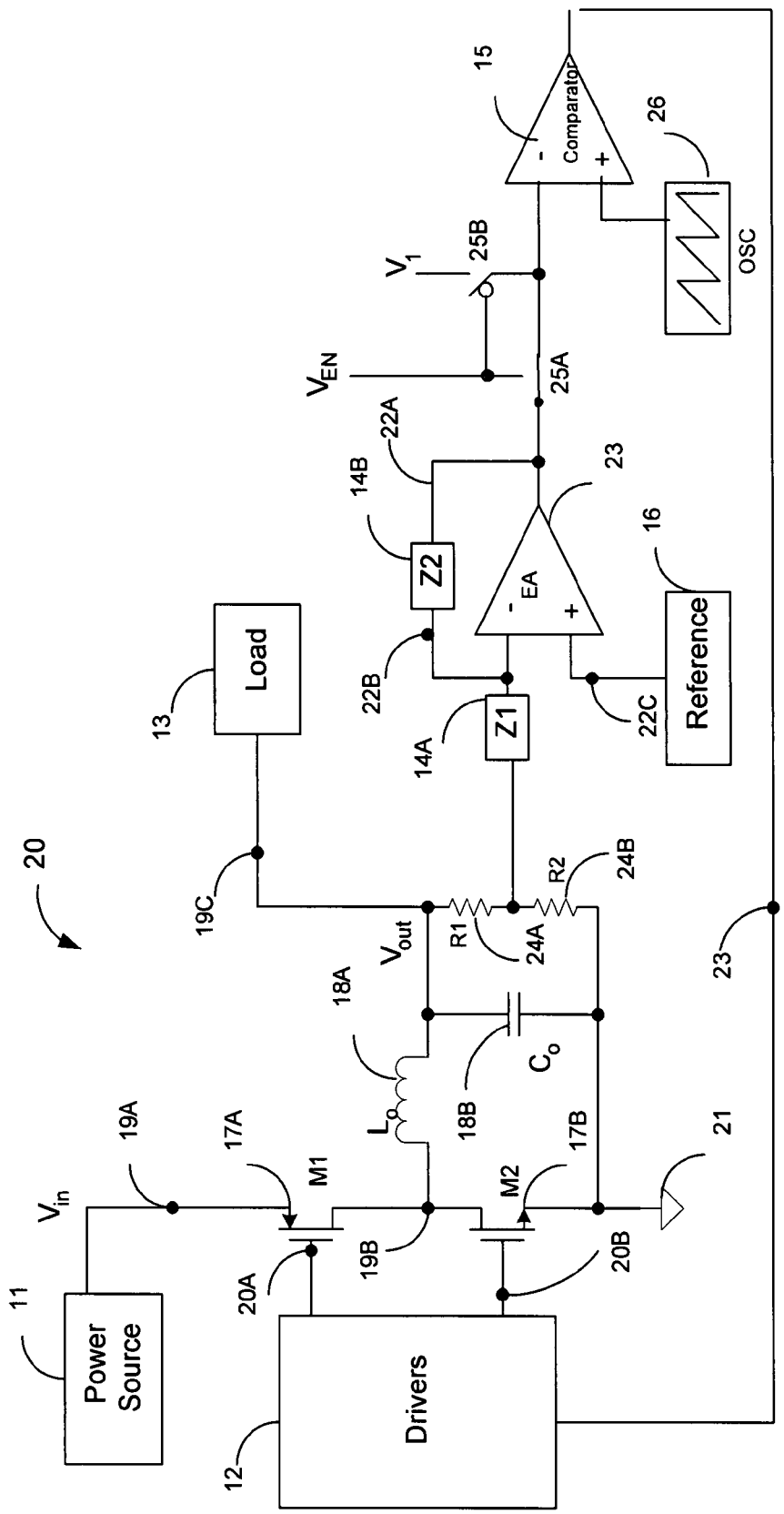
FIG. 3 illustrates an alternative embodiment of a startup circuit in accordance with the invention.
Figure 4:
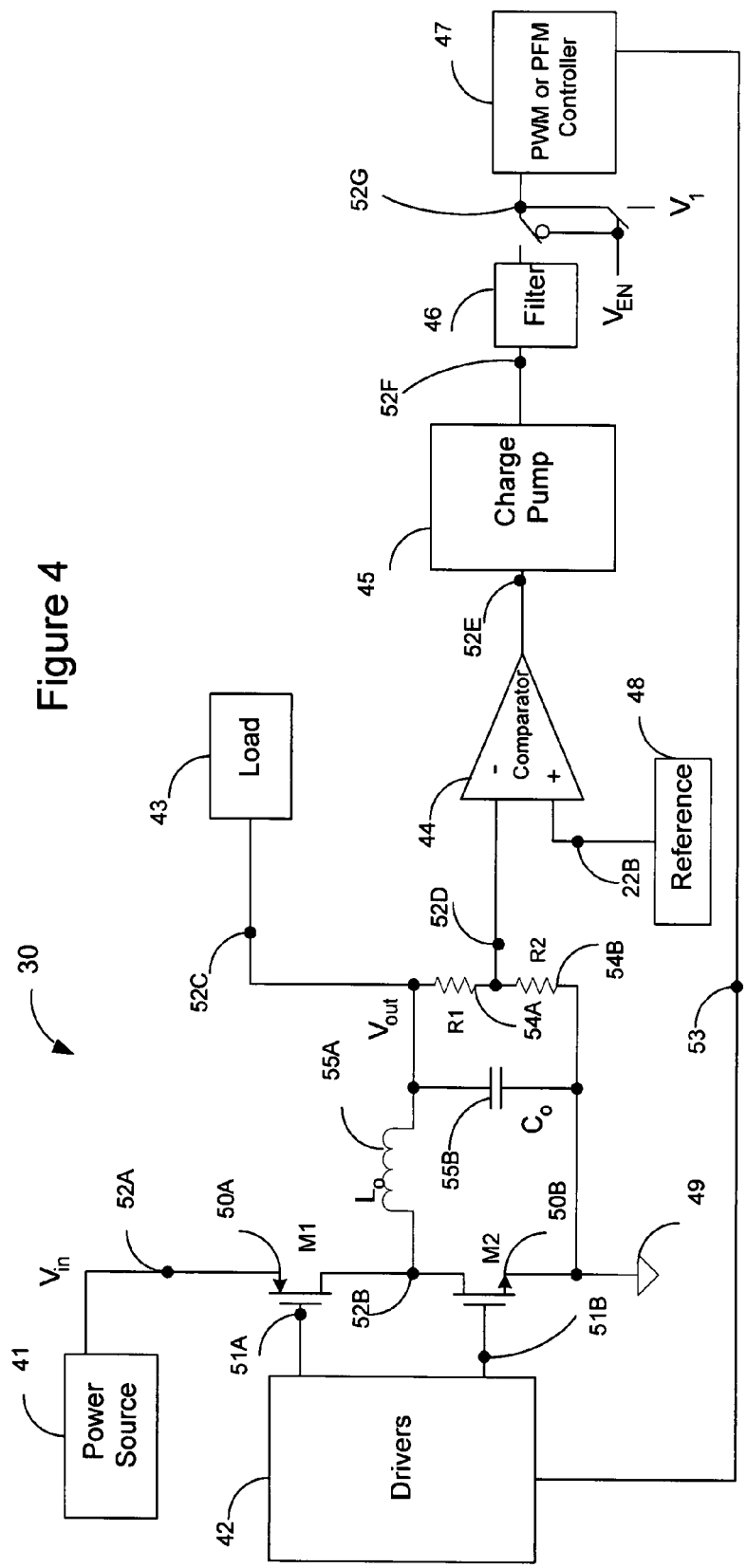
FIG. 4 illustrates a further alternative embodiment of the invention.

An alternative arrangement for implementing this invention is shown in FIGS. 3 and 4, in which a power source, 11 and 41, respectively, is connected to one side of complementary transistors M1 and M2, with the gates of the transistors both controlled by drivers block 42. The other side of the transistor M2 is connected to ground, as with FIG. 1. At the nodes 19B and 52B, between the transistors, an inductor L, indicated at 18A or 55A, is connected, and the other side of the inductor connects to the load 43 through a node $V_{out}$. As with FIG. 1, a capacitor Co, indicated at 18B or 55B, is connected between the node $V_{out}$ and ground, and a resistor bridge R1 and R2, indicated at 24A-B or 54A-B, is also connected from $V_{out}$ to ground. At the node between R1 and R2, indicated as 52D, the negative input to a comparator 44 is connected, through Z1 in FIG. 3 and directly in FIG. 4. In FIG. 3 the switches 25A-25B and the associated voltage sources $V_{EN}$ and $V_1$ are connected between the error amplifier 23 and the comparator 15, while the remainder of the circuit is the same as FIG. 1. In FIG. 4, the positive input to the comparator comes from a reference 48.

In FIG. 4, the output of the comparator is connected to a charge pump 45, which in turn connects to a filter 46. The output of the filter 46 is connected to a controller 47 through a pair of switches 48A-B, similar to the switches in FIG. 1. A voltage $V_{EN}$ actuates the switches, as discussed below. The output of the controller 47, which may be of any suitable type including either PWM or PFM, connects back to the drivers block 42.

In this case the input of filter 46 is connected to voltage $V_1$ when $V_{EN}=1$. After $V_{EN}$ is switched to 0, voltage at node 52G slowly increases to a voltage set by the loop from the output of the controller 47 back to the drivers block 42 and thence back to the comparator 44. The result is a slow increase in the period $T_{on}$, as shown in FIG. 2 and substantially the same as results from FIG. 1.

The value of $V_1$ depends upon the architecture, and is typically set by the designer at any appropriate voltage available within the system, since its function is to increase the on-time from zero (or, alternatively, a suitably small initial value) to a proper value set by the loop. Alternatively, $V_1$ can also be set such that it would initially create a large off-time (instead of small on-time) and then reduces the off-time slowly to a proper value set by the loop. In such an arrangement the value of the on-time is typically much smaller than the off-time at initial start-up. This can be achieved by adjusting the value of $V_1$ and then the value of $V_1$ can be used to reduce the off-time to a an appropriate value as can be defined by the control loop. It will therefore be appreciated that the present invention can be used to create a very small on-time at the initial start-up and then to increase the on-time to a value appropriate to the system, or the present invention can be used to create a very large off-time at initial start-up which is then reduced to a proper value.

Having described the invention in detail, including several embodiments and alternatives, those skilled in the art will appreciate that numerous other alternatives and equivalents exist which are within the scope of the present invention. Therefore the invention is intended not to be limited by the above description, but rather only by the appended claims.

I claim:

1. A startup circuit for controlling initial current in a DC/DC switching regulator, comprising
    an input for receiving power from a primary power source,
    an output adapted to be connected to a load,
    a first pair of switches connected together at a first midpoint node, each having a control terminal, and the pair having first and second terminals, wherein the first terminal receives power from the primary power source and the second terminal is connected to ground, and the load receives power during normal operation via the midpoint node,
    driver logic connected to each of the control terminals of the pair of switches,
    a reference signal generator including second switch logic for selectively enabling a single preset voltage to be applied from the time voltage is initially applied to the regulator until the voltage at the output reaches substantially the intended regulated voltage to one of a group comprising a comparator, a pulse width modulator, and a pulse frequency modulator for controlling the duration of the on or off times of the first pair of switches to gradually increase the power applied by the primary power source to the load without the use of an external capacitor to control the increase.

2. The startup circuit of claim 1 wherein the first pair of switches is comprised of transistors.

3. A startup circuit for controlling initial current in a DC/DC switching regulator, comprising
    an input for receiving power from a primary power source,
    an output adapted to be connected to a load,
    a first pair of switches connected together at a first midpoint node, each having a control terminal, and the pair having first and second terminals, wherein the first terminal receives power from the primary power source and the second terminal is connected to ground, and the load receives power during normal operation via the midpoint node,
    driver logic connected to each of the control terminals of the pair of switches, and
    a reference signal generator for controlling the duration of the on or off times of the first pair of switches to gradually increase the power applied by the primary power source to the load, wherein the reference signal generator includes a voltage divider having a second midpoint node and connected between the first midpoint node and ground and second switch logic for selectively enabling a single preset voltage to be applied from the time voltage is initially applied to the regulator until the voltage at the output reaches substantially the intended regulated voltage to comparison logic to control the operation of the first pair of switches.

4. Previously cancelled and rewritten in independent form as new claim 3.

5. The startup circuit of claim 3 wherein the comparison logic comprises error logic, selected from a group comprising an error amplifier and a comparator, and also includes a second pair of switches for applying the startup signal at startup.

6. The startup circuit of claim 5 wherein the comparison logic further comprises second comparison logic, one input to which is provided by a sawtooth signal and the other input to which is provided by an output of the error logic, the comparison logic having an output which forms an input to the driver logic.

7. The startup circuit of claim 5 wherein the comparison logic comprises comparator, charge pump, filter and controller connected serially.

8. A startup circuit for controlling initial current in a DC/DC switching regulator, comprising
- a power input for receiving power from a primary power source,
- an output adapted to be connected to a load,
- a pair of complementary transistors connected together at a midpoint node, each having a gate, and together having a first terminal and a second terminal, the first terminal connected to the power input and the second terminal is connected to ground,
- an inductor connected between the midpoint node and the output,
- a capacitance connected between the output and ground,
- a resistor divider having a pair or resistors connected serially at a divider node, the resistor divider being connected in parallel with the capacitor,
- reference voltage,
- error amplifier with negative feedback having connected at one input to the reference voltage and at a second input to the divider node,
- switch logic for selectively enabling a preset voltage to be applied to the error amplifier at startup,
- comparator connected at one input to an output of the error amplifier and at another input to a sawtooth signal,
- driver logic responsive to an output of the comparator for switching the states of the pair of transistors to gradually increase the power applied to the load from the primary source.

9. A startup circuit for controlling initial current in a DC/DC switching regulator, comprising
- a power input for receiving power from a primary power source,
- an output adapted to be connected to a load,
- a pair of complementary transistors connected together at a midpoint node, each having a gate, and together having a first terminal and a second terminal, the first terminal connected to the power input and the second terminal is connected to ground,
- an inductor connected between the midpoint node and the output,
- a capacitance connected between the output and ground,
- a resistor divider having a pair or resistors connected serially at a divider node, the resistor divider being connected in parallel with the capacitor,
- comparator connected at one input to the divider node and at another input to a reference signal,
- a charge pump responsive to the output of the comparator,
- controller responsive to a startup signal in a first mode and responsive to the output of the charge pump in a second mode,
- switch means for selecting between first mode and second mode, and
- driver logic responsive to an output of the comparator for switching the states of the pair of transistors to gradually increase the power applied to the load from the primary source.

10. The startup circuit of claim 9 wherein the controller is a PWM controller.

11. The startup circuit of claim 9 wherein the controller is a PFM controller.

12. A startup circuit for controlling initial current in a DC/DC switching regulator, comprising
- an input for receiving power from a primary power source,
- an output adapted to be connected to a load,
- a first pair of switches connected together at a first midpoint node, each having a control terminal, and the pair having first and second terminals, wherein the first terminal receives power from the primary power source and the second terminal is connected to ground, and the load receives power during normal operation via the midpoint node,
- driver logic connected to each of the control terminals of the pair of switches,
- a reference signal generator including second switch logic comprising a second pair of switches for selectively enabling a single preset voltage to be applied from the time voltage is initially applied to the regulator until the voltage at the output reaches substantially the intended regulated voltage to comparison logic for controlling the duration of the on or off times of the first pair of switches to gradually increase the power applied by the primary power source to the load.

13. The startup circuit of claim 12 wherein the first pair of switches is comprised of transistors.

* * * * *